Figure 1:
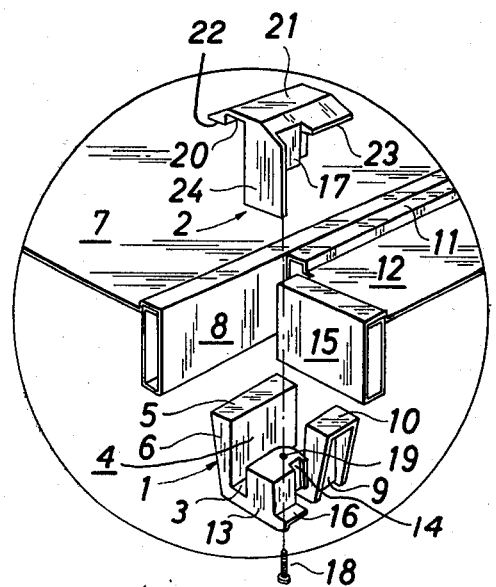

United States Patent [19]
Damberg

[11] 3,994,242
[45] Nov. 30, 1976

[54] GUSSET FOR SHELVES

[75] Inventor: Ejvind Damberg, Nykobing Falster, Denmark

[73] Assignee: A/S E. Damberg Group, Denmark

[22] Filed: Oct. 8, 1975

[21] Appl. No.: 620,842

[30] Foreign Application Priority Data
Oct. 11, 1974 Denmark .............................. 5344/74

[52] U.S. Cl. ................................... 108/64; 108/114
[51] Int. Cl.² .......................................... A47B 57/00
[58] Field of Search ............................ 108/64, 114; 403/217–219, 405–407; 312/140, 140.1, 140.3

[56] References Cited
UNITED STATES PATENTS
3,763,794   10/1973   Fleck .................................... 108/64

Primary Examiner—James C. Mitchell
Attorney, Agent, or Firm—Bucknam and Archer

[57] ABSTRACT

A gusset for assembling a first shelf and an identical transverse shelf in a corner arrangement without using a support column at the corner of the transverse shelf remote from the end edge of said first shelf. Said gusset comprises a lower portion having support surfaces abutting surface portions of a longitudinal rim flange of the first shelf and supports the lower surface of said shelf, and an upper portion having support surfaces abutting other surface portions of said longitudinal rim flange and resting on the upper surface of the shelf. When the upper and lower portions are clamped together by a screw the two assembled portions form recesses adapted to receive and clamp the free end of one of the longitudinal rim flanges of said transverse shelf.

4 Claims, 2 Drawing Figures

GUSSET FOR SHELVES

A gusset for shelves to be mounted perpendicularly to each other, each shelf comprising a number of shelf plates having downwardly extending rim flanges cut off at the corners said rim flanges being secured to vertical columns at the corners.

When it is desired to mount a shelving unit, e.g. a corner arrangement having shelves extending perpendicularly to each other, the end edges of a first set of shelves being flush with the longitudinal edges of a second set, it is a normal procedure to arrange a column at the contiguous corners of the shelves and to support the transverse set of shelves by means of a column at the corner arranged at a distance from the end flanges of the second set of shelves, said distance corresponding to the width of a shelf.

The object of the present invention is to provide a gusset eliminating the use of such column, the said corners of the second set of shelves being made to rest solely on the rim flanges of the longitudinal sides of the other set of shelves. This offers the great advantage that no column prevents free access to the corner portions of the shelves.

The gusset consists of a lower portion provided with support surfaces which at a shelf side may abut the front, under, and rear surfaces of a rim flange, and provided with a support surface which may abut the under surface of the shelf inside said rim flange and provided with abutment surfaces adapted to abut corresponding abutment surfaces of an upper portion, which by means of a screw may be clamped against the lower portion, said upper portion having support surfaces adapted to abut the front and upper surfaces of the rim flange of the shelf and the upper surface of the shelf inside said rim flange immediately above the corresponding support surface of the under portion, the lower and upper portions being provided with recesses adapted to receive and tightly surround the free ends of the downwardly extending rim flanges at a corner of a shelf, when said lower and upper portions are screwed together, said shelf being perpendicular to the first-mentioned shelf.

The lower portion of the gusset may easily be arranged on the rim flange of the longitudinal sides of one of the shelves, whereafter the free end portions of the flange of the transverse shelf may be inserted in the recesses, and the upper portion of the gusset may be put in position and clamped against the lower portion. The special support and abutment surfaces ensure rigid interconnection of the shelves and safe transmission of the load from the transverse shelf to the longitudinal one.

The invention will be described below with reference to the accompanying drawing, in which FIG. 1 shows an embodiment of the gusset according to the invention ready to connect a corner of a transverse shelf to the longitudinal surface of a longitudinal shelf, and FIG. 2 the gusset of FIG. 1 in position for interconnecting the shelves.

The gusset according to the invention consists of a lower portion 1 and an upper portion 2. Referring now to the drawing, the cross section of the lower portion is substantially U-shaped said lower portion being provided with an upright rear wall 4 extending upwardly from a bottom 3, the top portion of said wall ending in a horizontal flange 5, which at its outer surface is supported by reinforcing ribs, only one rib 6 being visible. The wall 4 is of such height that the flange 5 may form the support surface for the under surface of a longitudinal shelf 7 when the downwardly extending rim flange 8 is guided along the walll 4 to the bottom 3.

The lower portion is further provided with a front wall 9, the top portion of which ends in an abutment surface 10, said front wall 9 being arranged at a distance from the rear wall 4 corresponding to the sum of the thickness of the lateral rim flange 8 and an end rim flange 11 of a transverse shelf 12. As seen in the drawing, the rim flanges of the embodiment shown are provided with an edge portion extending upwardly beyond the shelf surface itself. The front wall 9 continues in a block 13, the distance between the inner surface of said block and the wall 4 corresponding to the width of the box-shaped flange 8, the latter thus being tightly surrounded. Furthermore, the outer surface of said block is provided with a recess 14, which may receive the end portion of the longitudinal rim flange 15 of the transverse shelf 12, while the under surface of the shelf behind the rim flange is resting on the abutment surface 10 and while the lower edge of the rim flange 15 is resting on an abutment surface 16.

After the flanges 8 and 15 have been put in position in the lower portion 1 of the gusset, the upper portion 2 of the gusset is arranged so that a block 17 is situated immediately above the upper surface of the block 13 and so that said block 17 may be clamped against the block 13 by means of a screw 18, which through an aperture 19 in the block of the lower portion may be screwed into a corresponding aperture (not shown) in the block 17. The gusset portions being assembled as described above, a recess 20 in a top portion 21 surrounds the upright portion of the rim flange 8, an abutment surface 22 of the under surface of the top portion presses the shelf 7 against the flange 5 forming the support surface. An abutment surface 23 simultaneously presses the shelf 12 against the abutment surface 10 of the lower portion. The top portion 21 is further provided with a downwardly extending end flange 24 abutting the end surface of the block 13 of the lower portion and forming a guide surface for easily assembling the upper and lower portions in a correct position.

Figure 2:
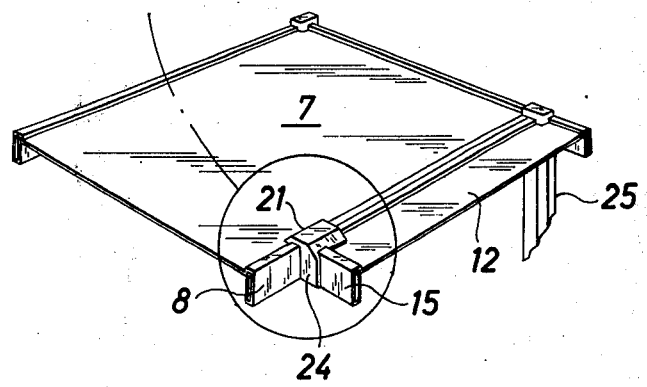

FIG. 2 shows the assembled gusset, the gusset together with a corner column 25 supporting one end of the transverse shelf 12 the load on the foremost corner shown in the drawing being transmitted through the gusset to the rim flange 8 of the shelf 7.

From the foregoing description, the artisan will appreciate that the invention provides a gusset for connecting together a pair of shelves 7 and 12 in adjoining relation, each shelf 7, 12 having an extended plate and rim flanges 8, 11, 15, etc. projecting transversely to the respective plate and extending lengthwise each along a corresponding edge of such plate. The gusset comprises an upper portion 2, a lower portion 1 and means 18 connecting the upper and lower portions 1 and 2 together. The lower portion has surfaces 3, 4, defining a first recess that receives and holds together in generally parallel adjoining relation, a pair of rim flanges 8, 12 each associated with a respective one of said shelves 7, 12. The lower portion 1 also has surfaces defining a second recess 14 that receives a rim flange 15 associated with one of said shelves, namely shelf 12, and holds said rim flange 15 in generally perpendicular relation to rim flange 8 associated with the other of said shelves (shelf 7), and received in the first recess. The upper portion 2 has surfaces 20 and 24 disposed to abut corresponding surfaces of the rim flanges 8, 11 and 15 to secure same in the first and second recesses respectively. In addition, the lower portion 1 has surfaces 5 and 10 that abut against respective plates of the shelves 7 and 12. Flange 24 of upper portion 2 abuts the lower portion 1 to endwise enclose the first recess. Upper portion 2 additionally has parts associated with portion 21 that extend over the pair of rim flanges 8 and 11 received in the first recess.

It will be understood that the gusset according to the invention makes it possible to construct corner shelves with free access to the shelves arranged in the corner, and by means of the support, guide and abutment surfaces described above, the gusset ensures safe transmission of load and rigid interconnection of the shelves.

I claim:

1. A gusset for connecting together a pair of shelves in adjoining relation, each shelf having an extended plate and rim flanges projecting transversely to said plate and extending lengthwise each along a corresponding edge of said plate, said gusset comprising an upper portion, a lower portion, and means connecting said upper and lower portions together, said lower portion having surfaces defining a first recess that receives and holds together in generally parallel adjoining relation a pair of rim flanges each associated with a respective one of said shelves, said lower portion having surfaces defining a second recess that receives a rim flange associated with one of said shelves and holds said rim flange in generally perpendicular relation to a rim flange associated with the other ot said shelves and received in said first recess, said upper portion having surfaces disposed to abut corresponding surfaces of said rim flanges to secure same in said first and second recesses.

2. A gusset according to claim 1 wherein said lower portion has surface that abuts against at least one plate of said shelves.

3. A gusset according to claim 1 wherein said upper portion has a flange abutting said lower portion to endwise enclose said first recess.

4. A gusset according to claim 1 wherein said upper portion extends over the pair of rim flanges received in said first recess.

* * * * *